(12) United States Patent
Ukita et al.

(10) Patent No.: US 8,817,417 B2
(45) Date of Patent: Aug. 26, 2014

(54) PERPENDICULAR MAGNETIC WRITE HEAD AND MAGNETIC RECORDING DEVICE

(71) Applicant: TDK Corporation, Tokyo (JP)

(72) Inventors: Hideyuki Ukita, Tokyo (JP); Kenta Hara, Tokyo (JP); Kenkichi Anagawa, Tokyo (JP); Yosuke Antoku, Tokyo (JP); Masashi Sano, Tokyo (JP); Shuji Okame, Tokyo (JP); Masaya Kato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/727,341

(22) Filed: Dec. 26, 2012

(65) Prior Publication Data

US 2014/0177104 A1 Jun. 26, 2014

(51) Int. Cl.
*G11B 5/245* (2006.01)
*G11B 5/39* (2006.01)
*G11B 5/235* (2006.01)

(52) U.S. Cl.
CPC ........................................ *G11B 5/39* (2013.01)
USPC .................... 360/119.03; 360/125.3; 360/122

(58) Field of Classification Search
CPC ................. G11B 5/3133; G11B 5/314; G11B 2005/0024; G11B 5/1278; G11B 5/3146
USPC ..................... 360/122, 119.01–119.04, 125.3
See application file for complete search history.

(56) References Cited

U.S. PATENT DOCUMENTS

| 5,384,680 A | 1/1995 | Mallary |
| 6,841,259 B1 | 1/2005 | Takahashi et al. |
| 8,238,059 B1 * | 8/2012 | Tang et al. ............... 360/125.03 |
| 8,279,548 B2 * | 10/2012 | Tsuchiya et al. ................. 360/59 |
| 8,284,516 B1 * | 10/2012 | Tang et al. ............... 360/125.03 |
| 8,498,079 B1 * | 7/2013 | Song et al. .................. 360/125.3 |
| 2008/0019040 A1 * | 1/2008 | Zhu et al. ....................... 360/110 |
| 2009/0052095 A1 * | 2/2009 | Yamada et al. ................ 360/324 |
| 2010/0220415 A1 * | 9/2010 | Yamada et al. ................ 360/319 |
| 2011/0134561 A1 * | 6/2011 | Smith et al. ....................... 360/59 |
| 2011/0255197 A1 * | 10/2011 | Tsuchiya et al. ............. 360/245.3 |
| 2011/0299192 A1 * | 12/2011 | Yamada et al. .................. 360/75 |
| 2011/0300409 A1 * | 12/2011 | Yamada et al. ............. 428/815.2 |
| 2012/0140361 A1 * | 6/2012 | Ota et al. ....................... 360/294 |
| 2012/0162823 A1 * | 6/2012 | Ikai et al. ................... 360/234.3 |
| 2012/0268844 A1 * | 10/2012 | Yamada et al. ............. 360/125.3 |
| 2012/0314326 A1 * | 12/2012 | Takeo et al. .............. 360/125.03 |
| 2013/0057980 A1 * | 3/2013 | Shiimoto et al. .............. 360/110 |
| 2013/0070367 A1 * | 3/2013 | Igarashi et al. ................. 360/75 |

FOREIGN PATENT DOCUMENTS

| JP | A-2-89207 | 3/1990 |
| JP | A-2011-86342 | 4/2011 |
| JP | A-2011-141934 | 7/2011 |
| JP | A-2012-108981 | 6/2012 |
| WO | WO 01/93286 A1 | 12/2001 |

\* cited by examiner

*Primary Examiner* — Will J Klimowicz
(74) *Attorney, Agent, or Firm* — Oliff PLC (57) ABSTRACT

A trailing shield is provided on a trailing side of a magnetic pole with a non-magnetic gap layer in between, and an intermediate layer having negative uniaxial magnetocrystalline anisotropy is provided between the non-magnetic gap layer and the trailing shield. The intermediate layer has a magnetic property in which an easy axis of magnetization is provided in an in-plane direction and thus magnetization is likely to occur in that direction, whereas a difficult axis of magnetization is provided in a direction intersecting the in-plane direction and thus magnetization is less likely to occur in that direction. Accordingly, magnetic flux becomes difficult to excessively flow from the magnetic pole into the trailing shield.

16 Claims, 8 Drawing Sheets

PERPENDICULAR MAGNETIC WRITE HEAD AND MAGNETIC RECORDING DEVICE

BACKGROUND OF THE INVENTION

1. Field of the Invention

The invention relates to a perpendicular magnetic write head provided with a magnetic pole and a trailing shield, and to a magnetic recording device using the perpendicular magnetic write head.

2. Description of Related Art

In recent years, along with an increased surface recording density in a magnetic recording medium (hereinafter, referred to as a "recording medium") such as a hard disk, improvement in performance of a magnetic write head is desired.

Therefore, as a recording system of a magnetic write head, a perpendicular magnetic recording system in which a direction of a signal magnetic field is set to a direction intersecting a recording surface of a recording medium attracts attention, in place of a longitudinal magnetic recording system in which a direction of a signal magnetic field is set to an in-plane direction of a recording surface. This is because a high linear recording density is obtainable and a recording medium in which information has been recorded is difficult to be affected by thermal fluctuation.

A magnetic write head of the perpendicular magnetic recording system (hereinafter, referred to as a "perpendicular magnetic write head") includes a main magnetic pole layer that guides magnetic flux generated in a thin film coil to a recording medium, and the main magnetic pole layer includes a front end section (a magnetic pole) that has a small width and generates a recording-use magnetic field (a perpendicular magnetic field). The configuration of the perpendicular magnetic write head has been variously studied in order to improve recording performance.

Specifically, a trailing shield is provided on a trailing side of the main magnetic pole layer with a non-magnetic gap layer in between (for example, Japanese Unexamined Patent Application Publication No. 2006-134507).

If the trailing shield is used, when magnetic flux concentrated on the front end section of the main magnetic pole layer is released toward the recording medium, a part of the magnetic flux is taken into the trailing shield, and thus magnetic field gradient of perpendicular magnetic field is increased. In addition, since, when the magnetic flux emitted from the main magnetic pole layer returns to the perpendicular magnetic write head through the recording medium, the magnetic flux is easily taken into the trailing shield, spread of the magnetic flux in a recording track width direction is suppressed. As a result, occurrence of erasure in adjacent tracks, namely, a defect in which information recorded in tracks adjacent to a track to be recorded is unintentionally erased is suppressed.

However, when the magnetic flux concentrated on the front end section of the main magnetic pole layer is excessively taken into the trailing shield, the amount of the magnetic flux released from the front end section is decreased, and the magnetic field intensity of the perpendicular magnetic field is accordingly decreased. Therefore, relationship of so-called trade off is established between securement of the magnetic field intensity of the perpendicular magnetic field and suppression of occurrence of erasure in adjacent tracks.

Accordingly, it is strongly desirable to achieve both securement of magnetic field intensity of perpendicular magnetic field and suppression of occurrence of erasure in adjacent tracks.

SUMMARY OF THE INVENTION

A perpendicular magnetic write head according to the invention includes: a magnetic pole; a trailing shield provided on a trailing side of the magnetic pole with a non-magnetic gap layer in between; and an intermediate layer provided between the non-magnetic gap layer and the trailing shield and having negative uniaxial magnetocrystalline anisotropy.

In addition, a magnetic recording device according to the invention includes a magnetic recording medium and a perpendicular magnetic write head, and the perpendicular magnetic write head includes a configuration similar to that of the above-described perpendicular magnetic write head according to the invention.

Here, "negative uniaxial magnetocrystalline anisotropy" means magnetic property in which an easy axis of magnetization is provided in an in-plane direction of the intermediate layer and thus magnetization is likely to occur in the in-plane direction, whereas a difficult axis of magnetization is provided in a direction intersecting the in-plane direction and thus magnetization is less likely to occur in the direction.

According to the perpendicular magnetic write head and the magnetic recording device of the invention, the trailing shield is provided on the trailing side of the magnetic pole with the non-magnetic gap layer in between, and the intermediate layer having the negative uniaxial magnetocrystalline anisotropy is provided between the non-magnetic gap layer and the trailing shield. As a result, external magnetic flux becomes easy to be taken into the trailing shield, and the magnetic flux becomes difficult to flow into the trailing shield from the magnetic pole. Consequently, spread of the external magnetic flux is suppressed and the amount of the magnetic flux released from the magnetic pole is secured, and therefore it is possible to achieve both securement of the magnetic field intensity of the perpendicular magnetic field and suppression of occurrence of erasure in adjacent tracks.

DETAILED DESCRIPTION OF THE PREFERRED EMBODIMENTS

[Structure of Thin Film Magnetic Head]

Figure 1A:
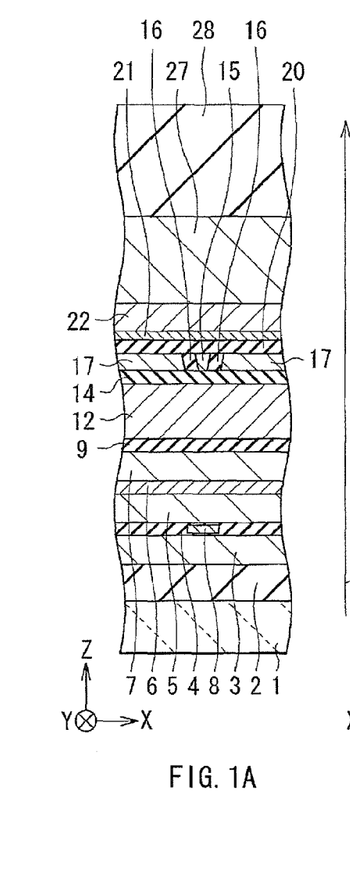
FIG. 1A and FIG. 1B are sectional views illustrating a structure of a thin film magnetic head using a perpendicular magnetic write head according to an embodiment of the invention.
Figure 1B:
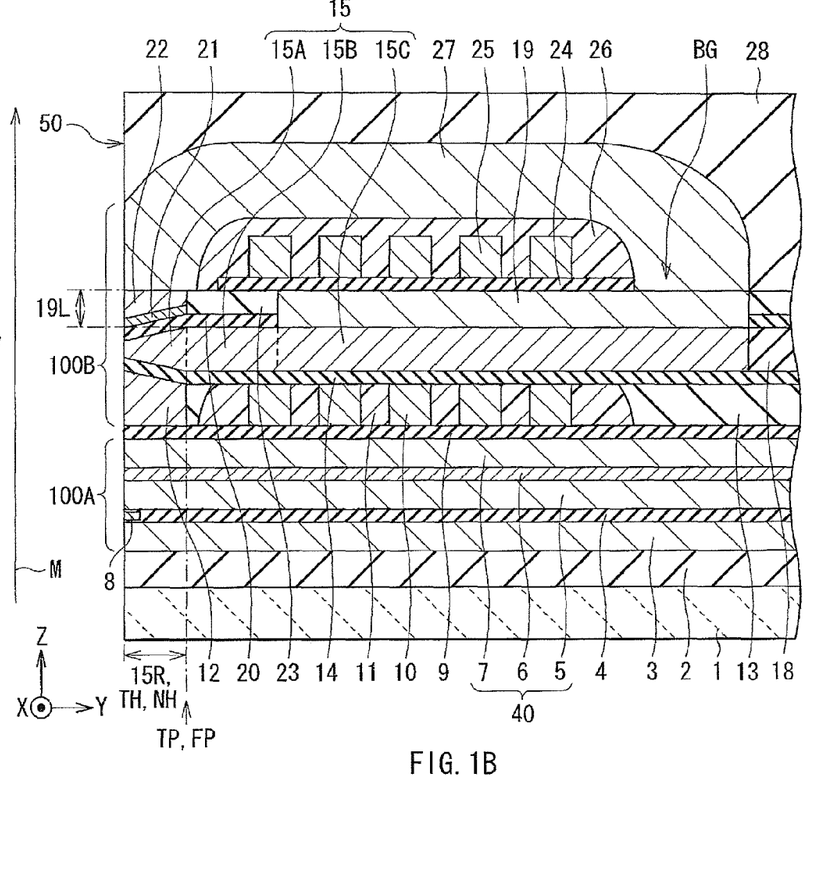
Figure 2:
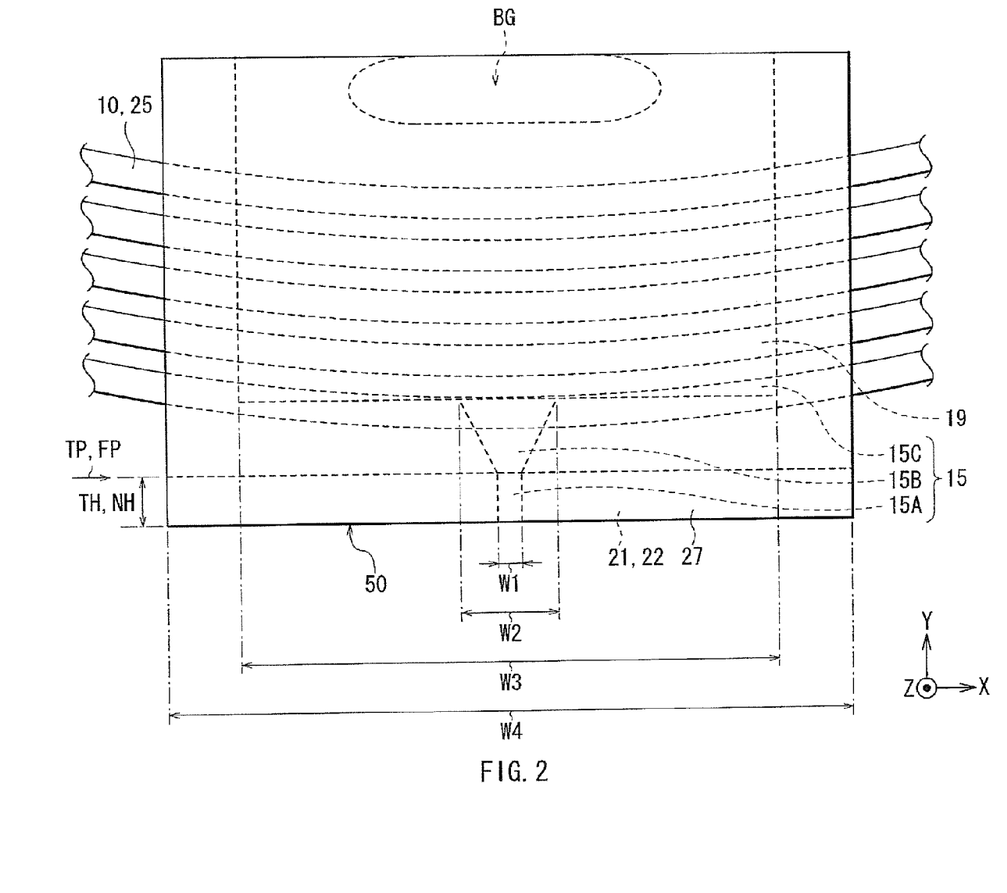
FIG. 2 is a plan view illustrating a structure of a main part of the thin film magnetic head.
Figure 3:
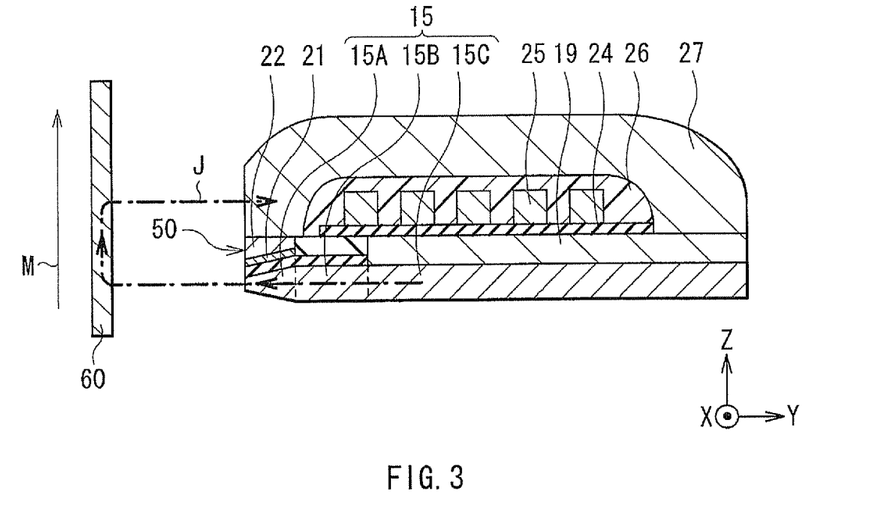
FIG. 3 is a sectional view for explaining a relationship between the thin film magnetic head and a recording medium.

FIG. 1A and FIG. 1B illustrate a cross-sectional structure of a thin film magnetic head using a perpendicular magnetic write head according to an embodiment of the invention, and FIG. 2 illustrates a planar structure of a main part of the thin film magnetic head. FIG. 3 describes a relationship between the thin film magnetic head and a recording medium 60, and selectively illustrates a part of the thin film magnetic head illustrated in FIG. 1B.

Note that FIG. 1A illustrates a cross-sectional surface parallel to an air bearing surface 50, FIG. 1B illustrates a cross-sectional surface perpendicular to the air bearing surface 50, and FIG. 2 illustrates a planar surface as viewed from a Z-axis direction. An up arrow M illustrated in FIG. 1A, FIG. 1B, and FIG. 3 indicates a direction in which the recording medium 60 travels relative to the thin film magnetic head (a traveling direction of the recording medium 60).

In the following description, dimensions, directions, and the like are referred to as follows. A dimension in an X-axis direction is referred to as a "width", a dimension in a Y-axis direction is referred to as a "length", and a dimension in the Z-axis direction is referred to as a "thickness". In the Y-axis direction, a side closer to the air bearing surface 50 is referred to as "front", and a side farther from the air bearing surface 50 is referred to as "back". In the traveling direction of the recording medium 60 (the direction of the arrow M), a front side (a side farther from a substrate 1) is referred to as a "trailing side", and a back side (a side closer to the substrate 1) is referred to as a "leading side". The X-axis direction is referred to as a "cross track direction (or write track width direction)", and the Y-axis direction is referred to as a "down track direction".

The thin film magnetic head described here performs magnetic processing on the recording medium 60 such as a hard disk, and is, for example, a composite head capable of performing both of reproducing processing and recording processing.

For example, as illustrated in FIG. 1A and FIG. 1B, the thin film magnetic head is configured by stacking an insulating layer 2, a read head section 100A, a separation layer 9, a write head section 100B, and an overcoat layer 28 in this order on the substrate 1, and includes the air bearing surface 50. Note that the function and the material of each of the components described below are merely an example.

The substrate 1 is formed of a ceramic material such as AlTiC ($Al_2O_3 \cdot TiC$). The insulating layer 2, the separation layer 9, and the overcoat layer 28 are each formed of a non-magnetic insulating material such as aluminum oxide ($AlO_x$), and examples of aluminum oxide include alumina ($Al_2O_3$).

The read head section 100A uses magneto-resistive effect (MR) to perform the reproducing processing. The read head section 100A is configured by stacking, for example, a lower lead shield 3, a shield gap 4, and an upper lead shield 40 in this order. A read element (an MR element 8) is so embedded in the shield gap 4 as to allow one end surface of the read element to be exposed on the air bearing surface 50.

The lower lead shield layer 3 and the upper lead shield layer 40 magnetically separate the MR element 8 from its surroundings, and extend backward from the air bearing surface 50. The lower lead shield layer 3 is formed of, for example, a magnetic material such as nickel iron alloy (NiFe), and nickel iron alloy may be, for example, Permalloy ($Ni_{80}Fe_{20}$: trade name), or others in which the content of nickel is 80 wt % and the content of iron is 20 wt %. For example, the upper lead shield layer 40 is configured by stacking magnetic layers 5 and 7 with a non-magnetic layer 6 in between. The magnetic layers 5 and 7 are each formed of, for example, a magnetic material such as Permalloy, and the non-magnetic layer 6 is formed of, for example, a non-magnetic conductive material such as ruthenium (Ru) or a non-magnetic insulating material such as alumina. Note that the upper lead shield layer 40 is not limited to a multilayer and may be a single layer of a magnetic material.

The shield gap layer 4 electrically separates the MR element 8 from its surroundings, and is formed of, for example, a non-magnetic insulating material such as alumina. The MR element 8 uses giant magneto-resistive effect (GMR), tunneling magneto-resistive effect (TMR), or the like to perform the reproducing processing.

The write head section 100B performs recording processing of a perpendicular magnetic recording system (a perpendicular magnetic write head). The write head section 100B is configured by stacking, for example, a magnetic coil 10 embedded by coil insulating layers 11, 13, and 14, a leading shield 12, a main magnetic pole layer 15 and an insulating layer 18, a non-magnetic gap layer 16 and a pair of side shields 17, an auxiliary magnetic pole layer 19 and a non-magnetic gap layer 20, an intermediate layer 21, a trailing shield 22 and an insulating layer 23, a thin film coil 25 embedded by coil insulating layers 24 and 26, and a return yoke 27 in this order.

Mainly, the thin film coil 10 generates leakage-suppression magnetic flux to suppress unintentional reaching (leakage) of recording-use magnetic flux, which is generated by the thin film coil 25, to the read head section 100A. The thin film coil 10 is formed of a conductive material such as copper (Cu), and has a spiral structure winding around a back gap BG. The back gap BG is a connection section between the auxiliary magnetic pole layer 19 and the return yoke 27. Note that the number of windings (the number of turns) of the thin film coil 10 is not particularly limited, however, is preferably coincident with the number of turns of the thin film coil 25.

The coil insulating layers 11, 13, and 14 electrically separates the thin film coil 10 from its surroundings. The coil insulating layer 11 is provided in a gap between the wirings of the thin film coil 10 and around the wirings, and is formed of, for example, a non-magnetic insulating material such as photoresist and spin-on-glass (SOG), that flow while being heated. The coil insulating layer 13 is provided around the coil insulating layer 11, and the coil insulating layer 14 is so provided as to cover the thin film coil 10 and the coil insulating layers 11 and 13. The coil insulating layers 13 and 14 are each formed of, for example, a non-magnetic insulating material such as alumina. Note that the coil insulating layer 14 also functions as a gap (so-called leading gap) that separates the leading shield 12 from the main magnetic pole layer 15.

Mainly, the leading shield 12 takes therein a part of the magnetic flux concentrated on the main magnetic pole layer 15 (a front end section 15A described later) near the air bearing surface 50, and suppresses spread of the magnetic flux in the down track direction (on a leading side of the front end section 15A). The leading shield 12 is formed of, for example, a magnetic material similar to that of the main magnetic pole layer 15, and is separated from the pair of side shields 17 with the coil insulating layer 14 in between.

The main magnetic pole layer 15 guides the recording-use magnetic flux generated in the thin film coil 25 to the recording medium 60, and extends backward from the air bearing surface 50. The main magnetic pole layer 15 is formed of, for example, a magnetic material with high saturation flux density such as iron-based alloy, and examples of the iron-based alloy include iron cobalt alloy (FeCo) and iron cobalt nickel alloy (FeCoNi).

For example, the planar shape of the main magnetic pole layer 15 is a battledore-shape as illustrated in FIG. 2. The main magnetic pole layer 15 includes, for example, the front end section 15A having a uniform width W1 defining a recording track width, a mid-section 15B having a width that gradually increases from W1 up to W2 larger than W1, and a back end section 15C having a uniform width W3 larger than the width W2 in this order from the air bearing surface 50. The front end section 15A is a section (a magnetic pole) that releases magnetic flux to generate a perpendicular magnetic field. The width W3 of the back end section 15C is, for example, larger than the length, and the planar shape of the back end section 15C is, for example, an oblong rectangle. A position where the width of the main magnetic pole layer 15 starts to increase from the width W1 is a so-called flare point FP.

The thickness of the main magnetic pole layer 15 may be uniform over the entire layer or may be different partially. In this case, for example, the thickness of the front end portion 15A is gradually decreased toward the air bearing surface 50 while the thickness of each of the intermediate section 15B and the back end section 15C is uniform. In this case, for example, an inclined surface (taper) is provided on the trailing side (upper side in FIG. 1B) and on the leading side (lower side in FIG. 1B) of the front end section 15A. However, the taper may be provided on one of the trailing side and the leading side of the front end section 15A.

The width of the end surface of the front end section 15A on the air bearing surface 50 is larger on the trailing side than on the leading side as illustrated in FIG. 1A. Therefore, the shape of the end surface of the front end section 15A is a shape in which the width W1 of an end edge (trailing edge) on the trailing side is larger than the width of an end edge (leading edge) on the leading side, and is for example, an inverted trapezoid. However, the shape of the end surface of the front end section 15A is not necessarily limited to the inverted trapezoid, and may be other shapes such as an inverted triangle or a rectangle. In this case, one or both of the two side end edges (side edges) on the end surface of the front end section 15A may be linear, bent, or curved. The trailing edge is a substantial write section of the front end section 15A, and the width W1 of the trailing edge is, for example, equal to or smaller than 0.2 μm.

The non-magnetic gap layer 16 is a gap (a so-called side gap) separating the pair of side shields 17 away from the main magnetic pole layer 15. The non-magnetic gap layer 16 is provided on both sides of the main magnetic pole layer 15 in the cross track direction, and is formed of, for example, a non-magnetic insulating material such as alumina.

Mainly, the pair of side shields 17 takes therein a part of the magnetic flux concentrated on the front end section 15A near the air bearing surface 50, and suppresses spread of the magnetic flux in the cross track direction. The side shield 17 is provided on the both sides of the main magnetic pole layer 15 (the front end section 15A) in the cross track direction, and is separated from the main magnetic layer 15 with the non-magnetic gap layer 16 in between. In addition, the side shield 17 is formed of, for example, a magnetic material similar to that of the main magnetic pole layer 15.

The insulating layer 18 electrically separates the main magnetic pole layer 15 from its surroundings. The insulating layer 18 is formed around the main magnetic pole layer 15, and is formed of, for example, a non-magnetic insulating material such as alumina.

The non-magnetic gap layer 20 is a gap (a so-called trailing gap) separating the trailing shield 22 away from the main magnetic pole layer 15. The non-magnetic gap layer 20 extends backward from the air bearing surface 50 while being adjacent to the main magnetic pole layer 15, and for example, is terminated at a position adjacent to the auxiliary magnetic pole layer 19. In addition, the non-magnetic gap layer 20 is formed of, for example, a non-magnetic insulating material such as alumina.

The auxiliary magnetic pole layer 19 is an auxiliary section containing magnetic flux to supply the magnetic flux to the main magnetic pole layer 15, and is formed of, for example, a magnetic material similar to that of the main magnetic pole layer 15. For example, the auxiliary magnetic pole layer 19 extends backward from a position recessed from the air bearing surface 50 on the trailing side of the main magnetic pole layer 15, and is connected to the main magnetic pole layer 15. Note that the planar shape of the auxiliary magnetic pole layer 19 is a rectangle having a width W3 as illustrated in FIG. 2, for example.

The intermediate layer 21 prevents the magnetic flux concentrated on the main magnetic pole layer 15 (the front end section 15A) from being excessively taken into the trailing shield 22. The intermediate layer 21 is provided between the non-magnetic gap layer 20 and the trailing shield 22, thereby being located closer to the main magnetic pole layer 15 than the trailing shield 22.

In particular, the intermediate layer 21 has negative uniaxial magnetocrystalline anisotropy. In other words, as described above, the intermediate layer 21 has the magnetic property in which the magnetization is likely to occur (easy to make magnetic flux flow) in the in-plane direction with the easy axis of magnetization whereas magnetization is less likely to occur (difficult to make magnetic flux flow) in the intersecting direction (direction intersecting the in-plane direction) provided with the difficult axis of magnetization. The "in-plane direction" is an extending direction of the intermediate layer 21 (the direction backward from the air bearing surface 50) in FIG. 1B.

The material of the intermediate layer 21 is not particularly limited as long as the material is one or two or more of materials that provide negative uniaxial magnetocrystalline anisotropy. Examples of the single-layer film include cobalt iridium alloy (CoIr), iron cobalt iridium alloy (FeCoIr), NiAs-type manganese antimony alloy (MnSb), iron carbon alloy (FeC), and cobalt iron alloy having a double hexagonal close-packed structure. Examples of a multilayer film include a stacked film of an iron layer and a cobalt layer (Fe/Co). Among them, one or both of CoIr and FeCoIr are preferable.

The composition of CoIr and FeCoIr is not particularly limited. However, atomic composition percentage of Ir is preferably equal to or larger than 10 at %. This is because negative uniaxial magnetocrystalline anisotropy is increased.

Note that the intermediate layer 21 may be provided in at least a part of a region (a facing region 15R) in which the front end section 15A as the magnetic pole and the trailing shield 22 face each other as illustrated in FIG. 1B. In this case, for example, the intermediate layer 21 is provided over the entire facing region 15R, thereby extending from the air bearing surface 50 to the flare point FP.

Mainly, the trailing shield 22 (so-called write shield) takes therein a part of the magnetic flux concentrated to the main magnetic pole layer 15 (the front end section 15A) near the air bearing surface 50, and suppresses spread of the magnetic flux in the down track direction (on the trailing side of the front end section 15A). The magnetic field gradient of the perpendicular magnetic field in the down track direction is increased by the function of the trailing shield 22, and therefore, the recording track width is decreased and the magnetic field component in an oblique direction is contained in the perpendicular magnetic field. Moreover, when the magnetic flux released from the main magnetic pole layer 15 returns to the write head section 100B through the recording medium 60, the magnetic flux is taken into the trailing shield 22, and therefore spread of the magnetic flux in the cross track direction is suppressed.

The trailing shield 22 is provided between the main magnetic pole layer 15 and the return yoke 27, and more specifically, for example, as illustrated in FIG. 1B, is located within a range (a layer 19L) defined by the thickness of the auxiliary magnetic pole layer 19 in a region anterior to the auxiliary magnetic pole layer 19. Moreover, the trailing shield 22 is separated away from the main magnetic pole layer 15 with the non-magnetic gap layer 20 and the intermediate layer 21 in between, and is formed independently from (physically separated from) the return yoke 27.

Note that the trailing shield 22 extends backward from the air bearing surface 50, and is terminated at the flare point FP, for example. Accordingly, the trailing shield 22 is adjacent to the insulating layer 23 on the back side, thereby playing a role to define the front-most end position (throat height zero position TP) of the insulating layer 23. In addition, the trailing shield 22 is formed of, for example, a magnetic material similar to that of the main magnetic pole layer 15, and the planer shape of the trailing shield 22 is a rectangle with a uniform width W4 larger than the width W3, for example, as illustrated in FIG. 2.

The insulating layer 23 defines a throat height TH, and is formed around the auxiliary magnetic pole layer 19. The front-most end position of the section that is formed between the auxiliary magnetic pole layer 19 and the trailing shield 22, of the insulating layer 23 is the throat height zero position TP as described above, and the distance between the throat height zero position TP and the air bearing surface 50 is the throat height TH. The insulating layer 23 is formed of, for example, a non-magnetic insulating material such as alumina. Note that in FIG. 1B and FIG. 2, for example, a case where the throat height zero position TP is coincident with the flare point FP is illustrated, however the throat height zero position TP may not be coincident with the flare point FP.

The thin film coil 25 generates recording-use magnetic flux, and in the thin film coil 25, current flows in a direction opposite to that of the thin film coil 10, for example. Incidentally, the detailed structure of the thin film coil 25 is similar to that of the thin film coil 10, for example.

The coil insulating layers 24 and 26 electrically separate the thin film coil 25 from its surroundings, and are connected with the insulating layer 23. The coil insulating layer 24 is provided between the auxiliary magnetic pole layer 19 and the thin film coil 25, and is formed of, for example, a non-magnetic insulating material similar to that of the coil insulating layers 13 and 14. The coil insulating layer 26 is provided in a gap between the wirings of the thin film coil 25 and around the wirings, and is formed of, for example, a non-magnetic insulating material similar to that of the coil insulating layer 11. Note that the front-most end position of each of the coil insulating layers 24 and 26 is recessed from the front-most end position of the insulating layer 23, for example.

Mainly, the return yoke 27 takes the magnetic flux supplied to the recording medium 60 into the write head section 100B to circulate the magnetic flux in the write head section 100B and the recording medium 60. The magnetic flux is taken in by not only the return yoke 27 but also the intermediate layer 21 and the trailing shield 22.

The return yoke 27 extends backward from the air bearing surface 50 on the trailing side of the auxiliary magnetic pole layer 19 and the trailing shield 22, and is connected to the trailing shield 22 on the forward part thereof as well as is connected to the auxiliary magnetic pole layer 19 at the back gap BG on the backward part thereof. Incidentally, the return yoke 27 is formed of, for example, a magnetic material similar to that of the main magnetic pole layer 15, and the planar shape of the return yoke 27 is a rectangle with the width W4, for example as illustrated in FIG. 2.

[Operation of Thin Film Magnetic Head]

The thin film magnetic head operates as follows.

In recording, when a current flows from a not-illustrated external circuit to the thin film coil 25 of the write head section 100B, recording-use magnetic flux J is generated as illustrated in FIG. 3. The magnetic flux J is accommodated in the main magnetic pole layer 15 and the auxiliary magnetic pole layer 19, and then flows inside the magnetic pole layer 15 toward the front end section 15A. At this time, the magnetic flux J is narrowed down in a width direction at the flare point FP as well as is narrowed down in a thickness direction according to decrease in thickness of the front end section 15A, and then is concentrated near the trailing edge. When the magnetic flux J concentrated near the trailing edge is released from the front end section 15A, perpendicular magnetic field is generated and the recording medium 60 is magnetized by the perpendicular magnetic field, and therefore information is magnetically recorded in the recording medium 60.

In this case, since the magnetic flux in opposite directions are generated in the thin film coils 10 and 25, the magnetic flux J becomes less likely to be leaked into the read head section 100A. Accordingly, lowering of the detection accuracy is suppressed in the MR element 8. In addition, the information recorded in the recording medium 60 is prevented from being unintentionally erased due to the unnecessary magnetic field that is generated when the magnetic flux J is taken into the lower lead shield layer 3 and the upper lead shield layer 40.

In particular, when the magnetic flux J is released from the front end section 15A, a part of the magnetic flux J is taken into the trailing shield 22, and thus the magnetic field gradient of the perpendicular magnetic field in the down track direction (on the trailing side of the front end section 15A) is increased. The magnetic flux J taken into the trailing shield 22 is resupplied to the main magnetic pole layer 15 through the return yoke 27.

Note that the magnetic flux J released from the main magnetic pole layer 15 toward the recording medium 60 magnetizes the recording medium 60 and then is resupplied to the main magnetic pole layer 15 through the return yoke 27. Therefore, the magnetic flux J circulates between the write head section 100B and the recording medium 60, thereby building a magnetic circuit.

On the other hand, at the time of reproduction, when a sense current flows through the MR element 8 of the read head section 100A, the resistance value of the MR element 8 is varied depending on reproduction-use signal magnetic field recorded in the recording medium 60. The resistance variation is detected as voltage variation so that information recorded in the recording medium 60 is magnetically reproduced.

[Function and Effects of Thin Film Magnetic Head]

In the thin film magnetic head, the trailing shield 22 is provided on the trailing side of the front end section 15A with the non-magnetic gap layer 20 in between, and the intermediate layer 21 having the negative uniaxial magnetocrystalline anisotropy is provided between the non-magnetic gap layer 20 and the trailing shield 22. Therefore, for the following reasons, it is possible to achieve both securement of the magnetic field intensity of the perpendicular magnetic field and suppression of occurrence of erasure in adjacent tracks.

Figure 4:
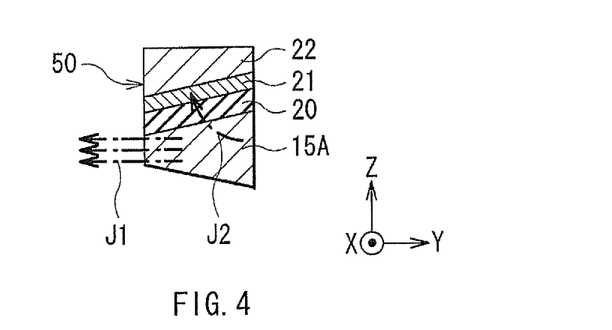
FIG. 4 is a sectional view for explaining an advantage of the thin film magnetic head of the invention.
Figure 5:
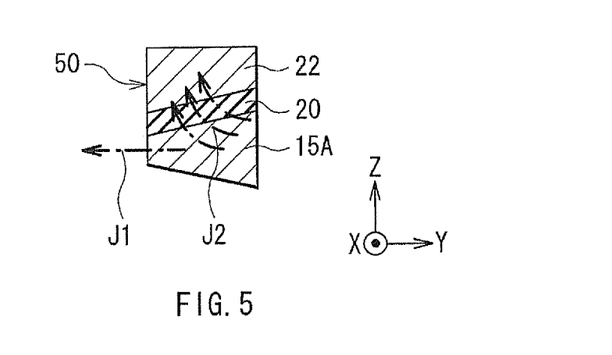
FIG. 5 is a sectional view for explaining a disadvantage of a thin film magnetic head according to a comparative example.

FIG. 4 describes an advantage of the thin film magnetic head of the present embodiment, and FIG. 5 describes a disadvantage of a thin film magnetic head of a comparative example. In FIG. 4 and FIG. 5, the main part (the front end section 15A, the non-magnetic gap layer 20, the intermediate layer 21, and the trailing shield 22) of the thin film magnetic head illustrated in FIG. 1B is selectively illustrated. The thin film magnetic head of the comparative example has a configuration similar to that of the thin film magnetic head of the present embodiment, except that the intermediate layer 21 is not provided between the non-magnetic gap layer 20 and the trailing shield 22.

In the comparative example, as illustrated in FIG. 5, despite the fact that the trailing shield 22 is separated away from the front end section 15A with the non-magnetic gap layer 20 in between, a part of the magnetic flux concentrated on the front end section 15A (magnetic flux J2) is easily taken into the trailing shield 22.

In this case, the magnetic flux returning from the recording medium 60 to the write head section 100B is taken into the trailing shield 22 so that spread of the magnetic flux in the cross track direction is suppressed. Accordingly, occurrence of erasure in adjacent tracks is suppressed. On the other hand, the amount of the magnetic flux J2 taken from the front end section 15A into the trailing shield 22 is excessively increased so that the amount of the magnetic flux J1 that is released from the front end section 15A in order to generate the perpendicular magnetic field is decreased. As a result, the magnetic field intensity of the perpendicular magnetic field is decreased. Consequently, relationship of trade off is established between securement of the magnetic field intensity of the perpendicular magnetic field and suppression of occurrence of erasure in adjacent tracks.

Incidentally, for reference, when a layer (an alternative layer) having saturation flux density higher than that of the trailing shield 22 is provided between the non-magnetic gap layer 20 and the trailing shield 22 in place of the intermediate layer 21, the magnetic flux is taken into the alternative layer more easily. Therefore, as compared with the above-described comparative example, since the amount of the magnetic flux J2 taken into the alternative layer is increased, the magnetic field gradient of the perpendicular magnetic field is increased whereas the amount of the magnetic flux J1 released from the front end section 15A is decreased, and the magnetic field intensity of the perpendicular magnetic field is accordingly decreased. In addition, in this case, since the magnetic flux J1 and the like are concentrated on the alternative layer, erasure easily occur in adjacent tracks due to generation of unintentional magnetic field.

In contrast, in the present embodiment, as illustrated in FIG. 4, the intermediate layer 21 provided between the non-magnetic gap layer 20 and the trailing shield 22 has the magnetic property in which the magnetic flux is likely to flow in the in-plane direction and is less likely to flow in a direction intersecting the in-plane direction.

In this case, since the flow of the magnetic flux J2 is blocked by the intermediate layer 21 even if the magnetic flux J2 intends to flow from the front end section 15A into the trailing shield 22, the magnetic flux J2 becomes difficult to flow from the front end section 15A in the trailing shield 22.

Therefore, the amount of the magnetic flux J2 taken into the trailing shield 22 from the front end section 15A is suppressed, and accordingly the amount of the magnetic flux J1 that is released from the front end section 15A in order to generate the perpendicular magnetic field is secured. In addition, similarly to the case of the comparative example, occurrence of erasure in adjacent tracks is suppressed by the presence of the trailing shield 22. Accordingly, the relationship of trade off described above is broken, and thus it is possible to achieve both securement of the magnetic field intensity of the perpendicular magnetic field and suppression of occurrence of erasure in adjacent tracks.

In particular, since the intermediate layer 21 is provided over the entire facing region 15R, it is possible to further prevent the magnetic flux J2 from being excessively taken into the trailing shield 22 from the front end section 15A. This is because the magnetic flux is easily concentrated on the front end section 15A having relatively small volume (magnetic flux capacity) in the main magnetic pole layer 15, and accordingly the magnetic flux J2 easily flows from the front end section 15A into the trailing shield 22.

[Modifications Relating to Configuration of Thin Film Magnetic Head]

(First Modification)

As described above, since the intermediate layer 21 is only necessary to be provided in at least a part of the facing region 15R, the formation range of the intermediate layer 21 may be changed in the facing region 15R.

Figure 6A:
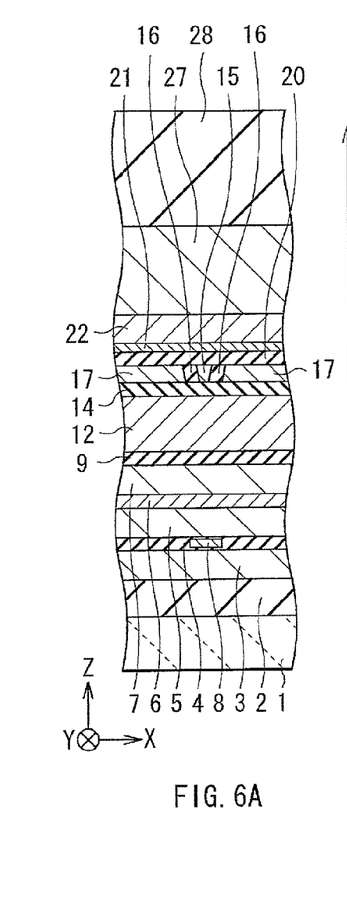
FIG. 6A and FIG. 6B are sectional views for explaining a first modification relating to the structure of the thin film magnetic head.
Figure 6B:
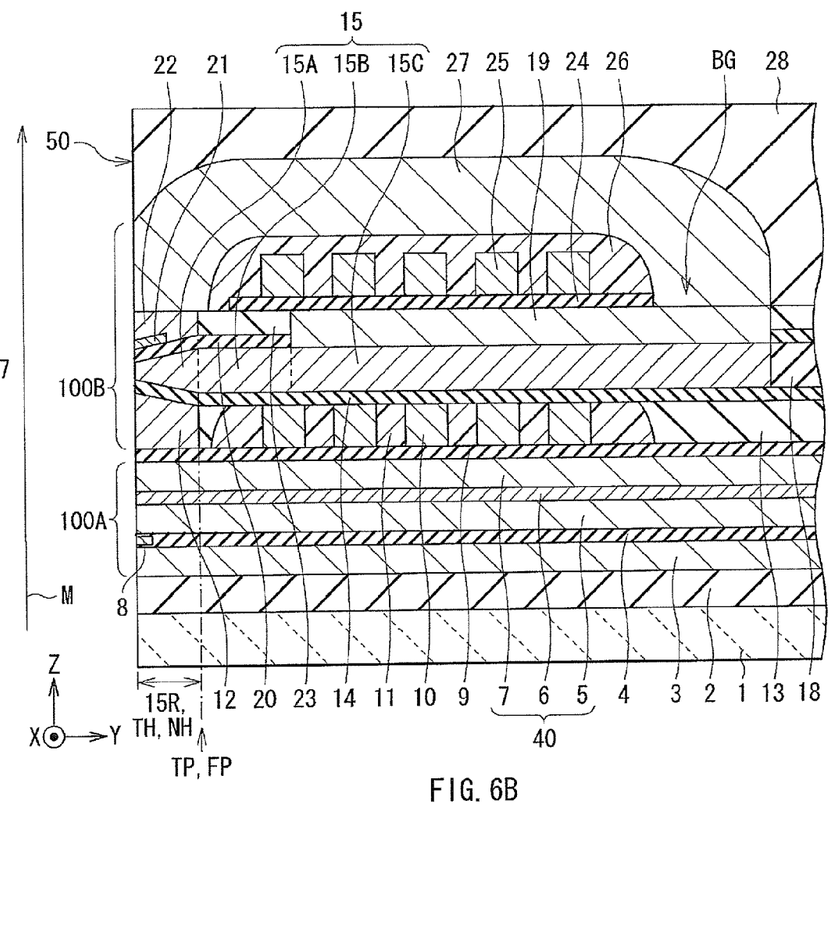

Specifically, for example, as illustrated in FIG. 6A and FIG. 6B, the intermediate layer 21 may be provided in a part of the facing region 15R. Also in this case, since the magnetic flux J2 becomes difficult to be taken into the trailing shield 22 from the front end section 15A within the presence range of the intermediate layer 21, the similar effects are obtainable.

However, when the intermediate layer 21 is provided in a part of the facing region 15R, it is preferable that the intermediate layer 21 be provided on a side as close to the air bearing surface 50 as possible, and it is more preferable that the intermediate layer 21 be provided so that the one end surface thereof is exposed on the air bearing surface 50. This is because the magnetic flux is easily concentrated with decreasing distance from the air bearing surface 50 inside the front end section 15A, and accordingly the magnetic flux J2 easily flows into the trailing shield 22 from the front end section 15A. This tendency becomes prominent particularly in the case where the thickness of the front end section 15A gradually decreases toward the air bearing surface 50.

(Second Modification)

When the position of the back end of the trailing shield 22 and the position of the back end of the front end section 15A are misaligned, the formation range of the intermediate layer 21 may be changed accordingly.

Figure 7A:
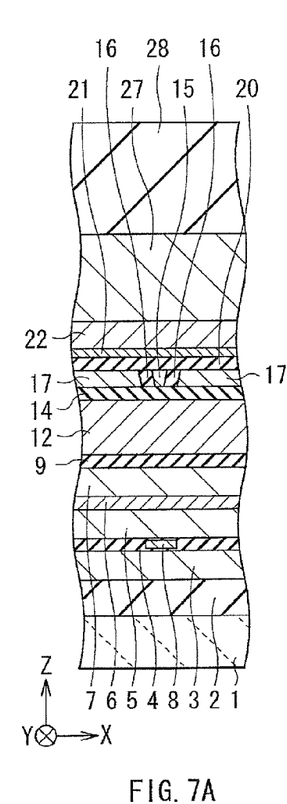
FIG. 7A and FIG. 7B are sectional views for explaining a second modification relating to the structure of the thin film magnetic head.
Figure 7B:
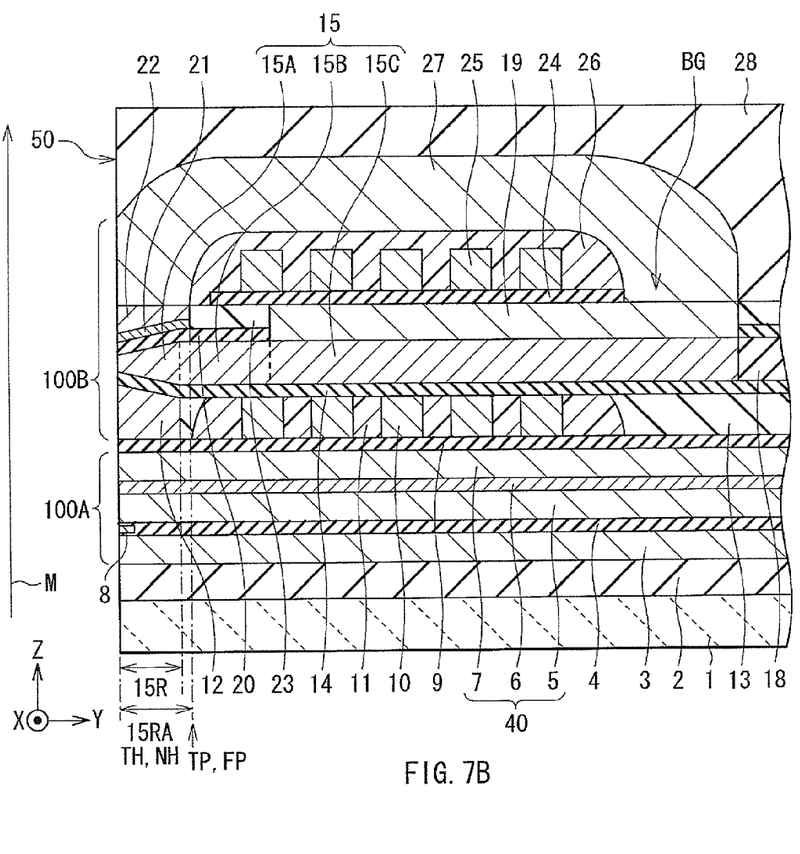

Specifically, for example, as illustrated in FIG. 7A and FIG. 7B, when the back end of the trailing shield 22 is positioned backward from the back end of the front end section 15A, the intermediate layer 21 is only necessary to be provided at least in the facing region 15R. In other words, the intermediate layer 21 may be provided only in the facing region 15R. Alternatively, the intermediate layer 21 may be provided over the entire region (the facing region 15R) in which the main magnetic pole layer 15 faces the trailing shield 22, by expanding the formation range of the intermediate layer 21 backward. Also in this case, similar effects are obtainable.

However, to further suppress the flowing of the magnetic flux J2 into the trailing shield 22 from the front end section 15A, it is preferable that the intermediate layer 21 be provided over the entire facing region 15R as in the latter case.

(Third Modification)

Figure 8A:
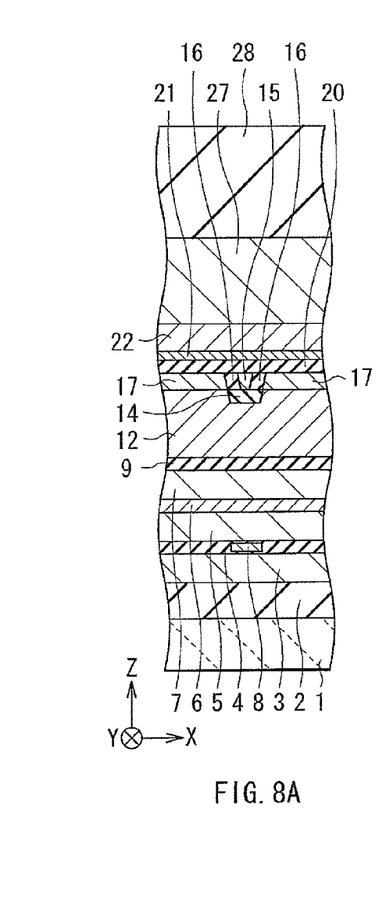
FIG. 8A and FIG. 8B are sectional views for explaining a third modification relating to the structure of the thin film magnetic head.
Figure 8B:
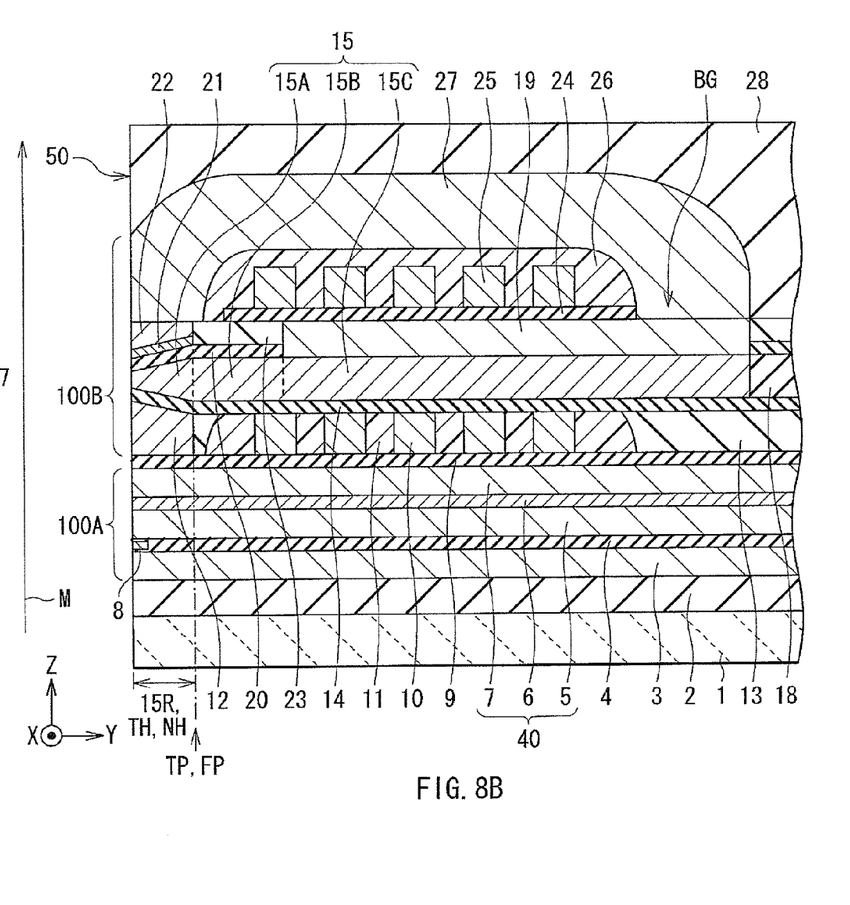

For example, as illustrated in FIG. 8A and FIG. 8B, the formation range of the coil insulating layer 14 may be narrowed in the cross track direction so that the trailing shield 12 may be connected to the side shields 17. In this case, the magnetic flux taken into the side shields 17 flows into the leading shield 12, and accordingly concentration of the magnetic flux on the side shields 17 is allowed to be suppressed.

(Fourth Modification)

Figures 9A, 9B:
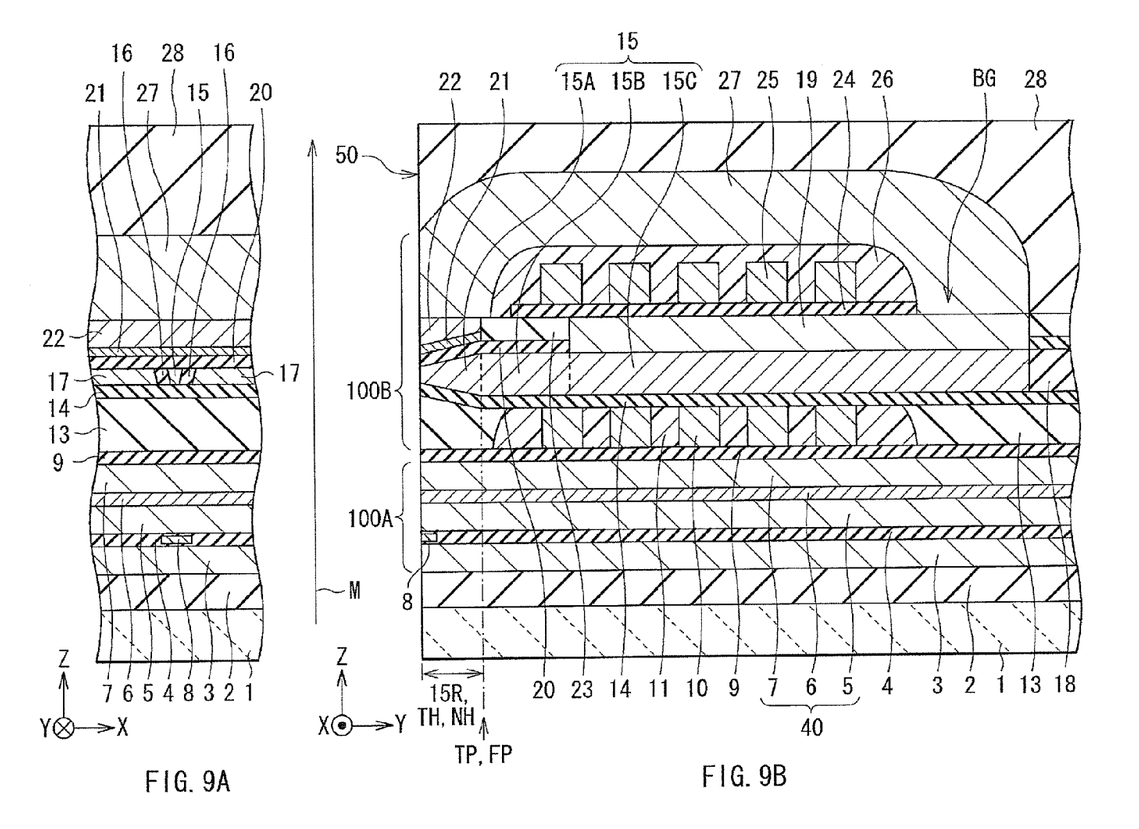
FIG. 9A and FIG. 9B are sectional views for explaining a fourth modification relating to the structure of the thin film magnetic head.

For example, as illustrated in FIG. 9A and FIG. 9B, in stead of providing the leading shield 12, the position where the leading shield 12 is supposed to be present may be embedded by the coil insulating layer 13. Also in this case, similar effects are obtainable.

In addition, in the case illustrated in FIG. 1A and FIG. 1B, in stead of providing the side shields 17, the positions where the side shields 17 are supposed to be present may be embedded by the insulating layer 18. Moreover, neither the leading shield 12 nor the side shields 17 may be provided.

[Configuration of Magnetic Recording Device]

Figure 10:
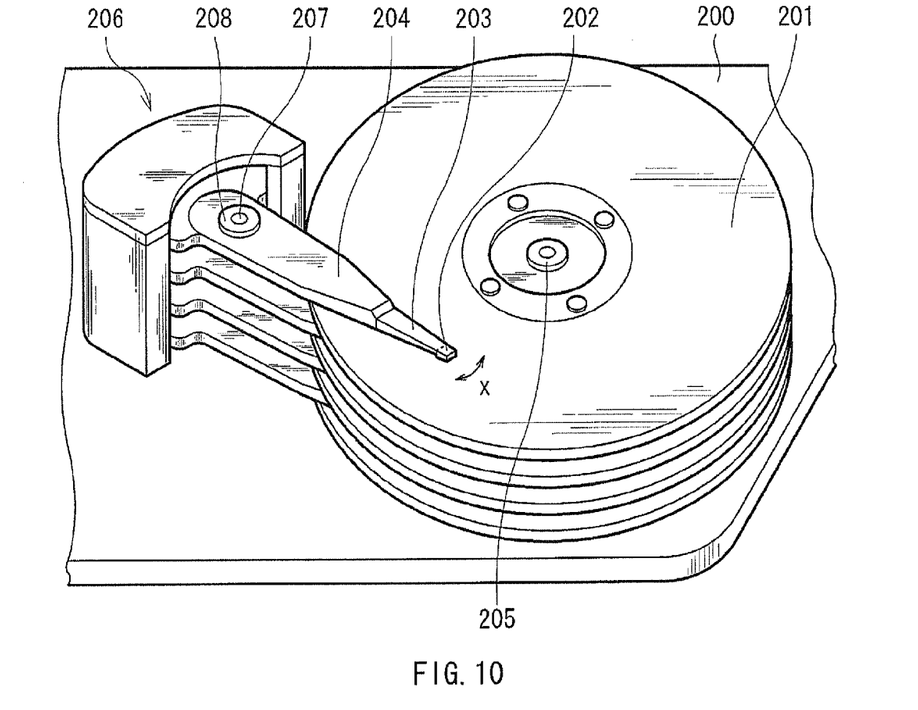
FIG. 10 is a perspective view illustrating a configuration of a magnetic recording device provided thereon with a thin film magnetic head.

Next, a configuration of the magnetic recording device including the above-described thin film magnetic head thereon will be described. FIG. 10 illustrates a perspective configuration of the entire magnetic recording device, and FIG. 11 illustrates a perspective configuration of a main part of the magnetic recording device.

The magnetic recording device described here is, for example, a hard disk drive. For example, as illustrated in FIG. 10, the magnetic recording device includes, inside of a housing 200, a plurality of magnetic disks (hard disks) 201 each corresponding to the recording medium 60 (FIG. 3), a plurality of suspensions 203 that is disposed to correspond to the magnetic disks 201 and each has one end supporting a magnetic head slider 202, and a plurality of arms 204 each supporting the other end of each of the suspensions 203. The magnetic disks 201 are rotatable around a spindle motor 205 fixed to the housing 200. The arms 204 are connected to a drive section 206 serving as a power source, and are pivotable through a bearing 208 around a fixed shaft 207 fixed to the housing 200. The drive section 206 includes, for example, a drive source such as a voice coil motor. The magnetic recording device is of, for example, a model in which the plurality of arms 204 is integrally pivotable around the fixed shaft 207. Incidentally, in FIG. 10, the housing 200 is partially cut out to facilitate visualization of an inner configuration of the magnetic recording device.

Figure 11:
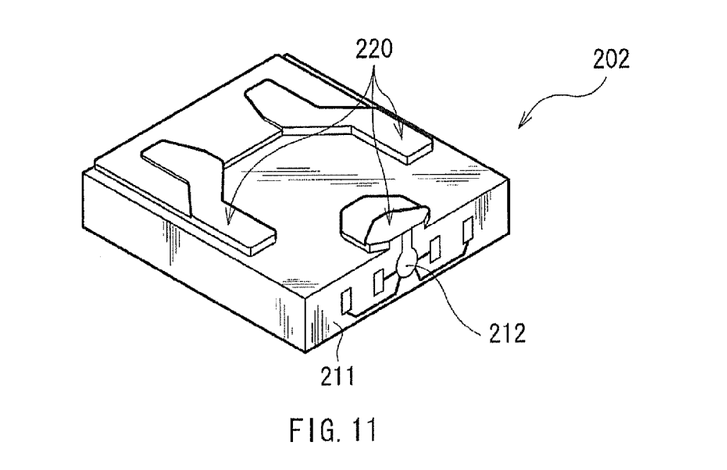
FIG. 11 is a perspective view illustrating a configuration of a main part of the magnetic recording device in an enlarged manner.

For example, as illustrated in FIG. 11, the magnetic head slider 202 is of a type that is configured by mounting a thin film magnetic head 212 corresponding to the above-described thin film magnetic head on one surface of a base material 211 having a substantially rectangular parallelepiped structure that is configured of a non-magnetic insulating material such as AlTiC. For example, a concavo-convex structure to reduce air resistance generated at the time when the arm 204 pivots is provided on one surface (the air bearing surface 220) of the base material 211, and the thin film magnetic head 212 is attached to the other surface (a surface on a front right side in FIG. 11) orthogonal to the air bearing surface 220. When the magnetic disk 201 rotates at the time of recording or reproducing information, the magnetic head slider 202 floats above a recording surface (a surface facing the magnetic head slider 202) of the magnetic disk 201 by using air flow generated between the recording surface of the magnetic disk 201 and the air bearing surface 220. Note that, in FIG. 11, the magnetic head slider 202 upside down from the state of FIG. 10 is illustrated to facilitate visualization of the configuration on the air bearing surface 220 side of the magnetic head slider 202.

In the magnetic recording device, when the arm 204 pivots at the time of recording or reproducing information, the magnetic head slider 202 moves to a predetermined region (a recording region) on the magnetic disk 201. Then, when the thin film magnetic head 212 is supplied with power in a state of facing the magnetic disk 201, the thin film magnetic head 212 performs recording processing or reproducing processing on the magnetic disk 201 based on the above-described operation principle.

In the magnetic recording device, since the above-described thin film magnetic head is mounted, recording performance is allowed to be improved.

EXAMPLES

Next, examples of the invention will be described in detail.

Experimental Examples 1 to 3

With use of simulation in which the thin film magnetic head according to the above-described embodiment (FIG. 1A and FIG. 1B) is modeled, recording magnetic field intensity (Oe=$10^3/(4\pi)$ A/m), magnetic field gradient (Oe/nm), and adjacent magnetic field intensity (Oe) were tested, and results illustrated in Table 1 were obtained. The recording magnetic field intensity is a maximum magnetic field intensity of perpendicular magnetic field in a track to be recorded, and the adjacent magnetic field intensity is a maximum magnetic field intensity of perpendicular magnetic field in a track adjacent to the track to be recorded.

In the simulation, the material of the main magnetic pole layer 15 and the trailing shield 22 was $Ni_{50}Fe_{50}$, the material of the intermediate layer 21 was CoIr, and the material of the non-magnetic gap layer 20 was alumina. In this case, it was assumed that the saturation flux density Bs of $Ni_{50}Fe_{50}$ was 15 kG, the saturation flux density Bs of CoIr was 15 kG, and the anisotropy field Hk of CoIr in the in-plane direction of the intermediate layer 21 was 15000 G. The composition of CoIr that satisfies a condition relating to the saturation flux density Bs and the anisotropy field Hk was estimated as corresponding to $Co_{85}Ir_{15}$.

Note that, for comparison, characteristics were tested by similar procedures except that an alternative layer ($Fe_{65}Co_{35}$ and $Ni_{50}Fe_{50}$) not having the negative uniaxial magnetocrystalline anisotropy was used in place of the intermediate layer 21. In this case, it was assumed that the saturation flux density Bs of $Fe_{65}Co_{35}$ was 24 kG, the anisotropy field Hk of $Fe_{65}Co_{35}$ in an in-plane direction of the alternative layer was 1300 G, the saturation flux density Bs of $Ni_{50}Fe_{50}$ was 15 kG, and the anisotropy field Hk of $Ni_{50}Fe_{50}$ in the in-plane direction of the alternative layer was 100 G.

TABLE 1

| | Main magnetic pole layer | Trailing Shield | | Intermediate layer | | | Recording magnetic | | Adjacent |
|---|---|---|---|---|---|---|---|---|---|
| Experimental Example | Material | Saturation flux density Bs (kG) | Presence or absence | Material | Saturation flux density Bs (kG) | Anisotropy field Hk (G) | field intensity (Oe) | Magnetic field gradient (Oe/nm) | magnetic field intensity (Oe) |
| 1 | $Ni_{50}Fe_{50}$ | 15 | Presence | CoIr | 15 | 15000 | 7967 | 206 | 4646 |
| 2 | $Ni_{50}Fe_{50}$ | 15 | Absence | $Fe_{65}Co_{35}$ | 24 | 1300 | 7893 | 206 | 4765 |
| 3 | $Ni_{50}Fe_{50}$ | 15 | Absence | $Ni_{50}Fe_{50}$ | 15 | 100 | 8090 | 159 | 4509 |

As illustrated in Table 1, when the alternative layer ($Ni_{50}Fe_{50}$) having the saturation flux density Bs equivalent to that of the trailing shield 22 was used (Experimental Example 3), the recording magnetic field intensity remarkably increased and the adjacent magnetic field intensity decreased, however the magnetic field gradient drastically decreased. In addition, when the alternative layer ($Fe_{65}Co_{35}$) having the saturation flux density Bs (=24 kG) higher than that of the trailing shield 22 was used (Experimental Example 2), higher recording magnetic field intensity and higher magnetic field gradient were obtained, however the adjacent magnetic field intensity also increased. In contrast, when the intermediate layer 21 (CoIr) having negative uniaxial magnetocrystalline anisotropy was used (Experimental Example 1), as compared with the above-described cases where the alternative layer was used, substantially equivalent recording magnetic field intensity and substantially equivalent magnetic field gradient were obtained, and the adjacent magnetic field intensity was suppressed.

From the results, providing the intermediate layer 21 having the negative uniaxial magnetocrystalline anisotropy between the non-magnetic gap layer 20 and the trailing shield 22 made it possible to achieve both securement of the magnetic field intensity of the perpendicular magnetic field and suppression of occurrence of erasure in adjacent tracks.

Hereinbefore, although the invention has been described with reference to the embodiment, the invention is not limited to the above-described embodiment, and various modifications may be made. For example, although the perpendicular magnetic write head of the invention has been applied to a composite head, this is not limitative, and the perpendicular magnetic write head of the invention is applicable to a write-only head without a read head section.

What is claimed is:

1. A perpendicular magnetic write head comprising:
a magnetic pole;
a trailing shield provided on a trailing side of the magnetic pole with a non-magnetic gap layer in between; and
an intermediate layer provided between the non-magnetic gap layer and the trailing shield and having negative uniaxial magnetocrystalline anisotropy,
wherein the intermediate layer is provided in an entire region in which the magnetic pole and the trailing shield face each other, and is in contact with the non-magnetic gap layer.

2. The perpendicular magnetic write head according to claim 1, further comprising an auxiliary magnetic pole layer provided on the trailing side of a main magnetic pole layer including the magnetic pole, wherein
the trailing shield is located in a thickness range defined by a thickness of the auxiliary magnetic pole layer.

3. The perpendicular magnetic write head according to claim 1, wherein the intermediate layer contains one or both of a cobalt iridium alloy (CoIr) and an iron cobalt iridium alloy (FeCoIr).

4. A magnetic recording device comprising:
a magnetic recording medium; and
the perpendicular magnetic write head according to claim 1.

5. A perpendicular magnetic write head comprising:
a magnetic pole;
a trailing shield provided on a trailing side of the magnetic pole with a non-magnetic gap layer in between; and
an intermediate layer provided between the non-magnetic gap layer and the trailing shield and having negative uniaxial magnetocrystalline anisotropy,
wherein the intermediate layer is in contact with the trailing shield, and is in contact with the non-magnetic gap layer.

6. The perpendicular magnetic write head according to claim 5, wherein the intermediate layer is provided in at least a part of a region in which the magnetic pole and the trailing shield face each other.

7. The perpendicular magnetic write head according to claim 5, wherein
the magnetic pole and the trailing shield each extend backward from an air bearing surface,
a back end of the trailing shield is located behind a back end of the magnetic pole, and
the intermediate layer is provided at least in a region in which the magnetic pole and the trailing shield face each other.

8. The perpendicular magnetic write head according to claim 5, further comprising an auxiliary magnetic pole layer provided on the trailing side of a main magnetic pole layer including the magnetic pole, wherein
the trailing shield is located in a thickness range defined by a thickness of the auxiliary magnetic pole layer.

9. The perpendicular magnetic write head according to claim 5, wherein the intermediate layer contains one or both of a cobalt iridium alloy (CoIr) and an iron cobalt iridium alloy (FeCoIr).

10. A magnetic recording device comprising:
a magnetic recording medium; and
the perpendicular magnetic write head according to claim 5.

11. A perpendicular magnetic write head comprising:
a magnetic pole;
a trailing shield provided on a trailing side of the magnetic pole with a non-magnetic gap layer in between; and
an intermediate layer provided between the non-magnetic gap layer and the trailing shield and having negative uniaxial magnetocrystalline anisotropy, wherein the non-magnetic gap layer is formed of an insulating material, and the intermediate layer is in contact with the non-magnetic gap layer.

12. The perpendicular magnetic write head according to claim 11, wherein the intermediate layer is provided in at least a part of a region in which the magnetic pole and the trailing shield face each other.

13. The perpendicular magnetic write head according to claim 11, further comprising an auxiliary magnetic pole layer provided on the trailing side of a main magnetic pole layer including the magnetic pole, wherein
the trailing shield is located in a thickness range defined by a thickness of the auxiliary magnetic pole layer.

14. The perpendicular magnetic write head according to claim 11, wherein the intermediate layer contains one or both of a cobalt iridium alloy (CoIr) and an iron cobalt iridium alloy (FeCoIr).

15. The perpendicular magnetic write head according to claim 11, wherein
the magnetic pole and the trailing shield each extend backward from an air bearing surface,
a back end of the trailing shield is located behind a back end of the magnetic pole, and
the intermediate layer is provided at least in a region in which the magnetic pole and the trailing shield face each other.

16. A magnetic recording device comprising:
a magnetic recording medium; and
the perpendicular magnetic write head according to claim 11.

* * * * *